(12) United States Patent
Janich (10) Patent No.: US 6,588,768 B1
(45) Date of Patent: Jul. 8, 2003

(54) DEVICE FOR SEALING (75) Inventor: Hans-Jurgen Janich, Grub am Forst (DE)

(73) Assignee: Janich GmbH & Co., Forst (DE)

( * ) Notice: Subject to any disclaimer, the term of this patent is extended or adjusted under 35 U.S.C. 154(b) by 0 days.

(21) Appl. No.: 09/686,218

(22) Filed: Oct. 11, 2000

(30) Foreign Application Priority Data

Oct. 13, 1999 (DE) .......................................... 199 49 370

(51) Int. Cl.[7] ................................................. F16J 15/02
(52) U.S. Cl. ........................ 277/637; 277/640; 277/644
(58) Field of Search ................................ 277/637, 640, 277/644, 645, 639

(56) References Cited

U.S. PATENT DOCUMENTS

| | | | | |
|---|---|---|---|---|
| 2,345,743 A | * | 4/1944 | Gaston | |
| 2,891,289 A | * | 6/1959 | Guilbert, Jr. | |
| 3,154,311 A | * | 10/1964 | Gustafson, Jr. | |
| 4,077,432 A | * | 3/1978 | Herr | 137/601 |
| 4,214,571 A | * | 7/1980 | Scherer | 126/190 |
| 4,493,430 A | * | 1/1985 | Sie | 220/224 |
| 4,527,773 A | * | 7/1985 | Muller et al. | 251/306 |
| 4,660,805 A | * | 4/1987 | Hahn et al. | 251/328 |
| 4,724,863 A | * | 2/1988 | Connor | 137/240 |
| 4,822,060 A | * | 4/1989 | Moyer et al. | |
| 4,892,116 A | * | 1/1990 | Grasseschi | 137/360 |
| 5,159,954 A | * | 11/1992 | Janich | 137/557 |
| 5,193,823 A | * | 3/1993 | Janich | |
| 5,667,226 A | * | 9/1997 | Janich | |
| 5,950,367 A | * | 9/1999 | Starke | 49/499.1 |
| 6,053,505 A | * | 4/2000 | Starke | 277/630 |

FOREIGN PATENT DOCUMENTS

| | | |
|---|---|---|
| DE | 19828896 C1 | 9/1999 |
| EP | 0340430 B1 | 6/1993 |

* cited by examiner

*Primary Examiner*—Anthony Knight
*Assistant Examiner*—Alison K. Pickard
(74) *Attorney, Agent, or Firm*—Muramatsu & Associates

(57) ABSTRACT

A device for sealing the contact zone between two apparatus parts which are movable relative to one another. The device includes a sealing element which extends along the contact zone and is fixed on the first apparatus part and also a mating surface which is provided on the second apparatus part and comes into contact with the sealing element in a closed position of the two apparatus parts. The sealing element is formed by a resilient hollow section body which has at right angles to its longitudinal extent a part-zone which is curved in an arc shape in an open position of the two apparatus parts and rests resiliently on the mating surface in the closed position of the two apparatus parts. The hollow section body—in the open position—has a circular cross-section at right angles to its longitudinal extent.

8 Claims, 10 Drawing Sheets

DEVICE FOR SEALING

FIELD OF THE INVENTION

The invention relates to a device for sealing the contact zone between two apparatus parts, which are movable relative to one another, this device comprising a sealing element which extends along the contact zone and is fixed on the first apparatus part and also a mating surface which is provided on the second apparatus part and comes into contact with the sealing element in a closed position of the two apparatus parts.

BACKGROUND OF THE INVENTION

Devices of this type are provided for example in shut-off elements such as pivoting flaps, rotating flaps or slide plates which are provided in hot gas pipelines of large dimensions where they ensure a reliable gas-tight seal in the closed position. The sealing element which is used in this case must have a sufficiently great resilient travel in order to be able to compensate for irregularities on the mating surface and expansions of the material due to the hot gas.

Therefore the most varied cross-sectional shapes for the sealing element are known in the art. The sealing element is usually formed by an elongated spring steel strip which has two planar longitudinal edge regions as well as a zone which is disposed between these two planar longitudinal edge regions and is curved in the shape of an arc at right angles to the longitudinal direction of the spring steel strip, the sealing element resting resiliently on the mating surface with a part of this curved zone in the closed position of both apparatus parts. In a known construction of this type, the two planar longitudinal edge regions of the sealing element constitute a straight-line extension of the zone which is curved in the shape of an arc, the two planar longitudinal edge regions being clamped in a separate clamping arrangement. However, with this construction the considerable height of the construction and difficult installation are particularly disadvantageous.

A sealing element is known from EP-A-0 340 430 which has at least one chamfer between a longitudinal edge region and the curved zone and is otherwise shaped so that the two longitudinal edge regions lying one above the other point towards the same side and are clamped together by means of a clamping arrangement. The height of the construction can be markedly reduced by the chamfering of one or both longitudinal edge regions.

A suitable sealing element, particularly for hot gas pipelines, must not only have sufficient resiliency but must also have a sufficiently great resilient travel in order to compensate for the thermal expansions which are to be expected, but, moreover, it must also have sufficient rigidity. So long as the sealing element is not resting on the mating surface, it is in fact exposed to an extraordinarily strong flow of hot gas. The flow speed increases substantially, above all during the closing operation, so that self-oscillations of the sealing element can occur. In the long term, such self-oscillations can lead to damage or fracture of the sealing element. In practice, it has been shown that chamfered sealing elements are particularly at risk in this connection.

A sealing element is known from DE-C-198 28 896 which is formed by a strip of spring steel sheet which extends along the contact zone, is curved in the shape of a hollow section and of which the two Longitudinal edge regions form gripping edges which are clamped on one of the two apparatus parts at a distance from one another which amounts to at least 10% of the width of the sealing element, wherein in the closed position of the shut-off element the sealing element rests by spring action with a sealing force on the seal seat with a sealing zone which has a convex curvature relative to the seal seat. The sealing zone of this strip of spring steel sheet is bent by plastic deformation in the form of a roof ridge with roof surfaces adjoining it on both sides, the two roof surfaces being oriented at an angle of 60° to 160° relative to one another. A further bend which is produced by plastic deformation and is convex towards the exterior is provided in each case on the longitudinal edge of the two roof surfaces remote from the roof ridge, and a side surface which is planar at least in a first portion and has the gripping edge formed on its free longitudinal edge in each case adjoins the said bend. Such a sealing element facilitates substantially greater resilient travel than hitherto, particularly resilient travel of up to 30 mm, without the rigidity of the sealing element being unacceptably decreased. Nevertheless, even with this element, self-oscillations due to the high gas speeds cannot be avoided, particularly during the closing operation. Thus with this sealing element too the chamfered regions are endangered to a considerable extent due to the self-oscillations.

In certain cases in which a hundred percent sealing is necessary, two sealing elements are disposed adjacent to one another and confining air is blown into the space between them. In order to ensure reliable sealing, the confining air must be blown in with a higher pressure than the hot gas stream. However, the sealing device according to DE-C-198 28 896 is less suitable for this, since the relatively large roof surfaces buckle inwards at relatively high pressure and can then lead to the sealing element becoming detached from the mating surface.

SUMMARY OF THE INVENTION

The object of the invention therefore is to provide a device for sealing the contact zone between two apparatus parts which are movable relative to one another which is distinguished by good sealing.

According to a first embodiment, the sealing element is formed by a resilient hollow body which—in an open position—has a circular cross-section at right angles to its longitudinal extent and rests resiliently on the mating surface with a part-zone in the closed position of the two apparatus parts.

The circular cross-section facilitates very great resilient travel in order in particular to be able to compensate for thermal expansions due to the effect of the temperature of any hot gases. Moreover, since the sealing element has no chamfers, it is distinguished by a long service life.

The hollow section body is preferably closed by a section made from spring steel which is closed in cross-section.

In an embodiment according to the invention at least one clamping strip is provided in the interior of the hollow section body, this clamping strip being fixed on the first apparatus part via openings in the hollow section body in order to grip the sealing element.

The sealing element according to a preferred embodiment also has means for stabilizing the hollow section body which are disposed in the hollow section body and fixed on the first apparatus part. In this way, self-oscillations of the sealing element in the open position can be avoided or reduced.

According to a further embodiment, the device for sealing the contact zone between two apparatus parts which are movable relative to one another comprises a sealing element which extends along the contact zone and is fixed on the first apparatus part and also a mating surface which is provided on the second apparatus part and comes into contact with the sealing element in a closed position of the two apparatus parts, the sealing element being formed by a resilient hollow section body which has at right angles to its longitudinal extent a part-zone which is curved in an arc shape in an open position of the two apparatus parts and rests resiliently on the mating surface in the closed position of the two apparatus parts. In the region of the contact zone with the sealing element, the mating surface has means for the delivery of confining air. In this way a hundred percent sealing of the contact zone between the two apparatus parts can be achieved.

Moreover, if the hollow section body has a circular cross-section at right angles to its longitudinal extent—in an open position—a relatively wide contact zone between the two apparatus parts is produced in order to ensure sufficient space for installation of the means for delivery of the confining air.

The means for delivery of the confining air are advantageously formed by a slot which extends along the contact zone.

BRIEF DESCRIPTION OF THE DRAWINGS

Further embodiments and advantages of the invention are explained in greater detail with reference to the description of some embodiments and to the drawings, in which.

DETAILED DESCRIPTION OF THE INVENTION

Figure 1:
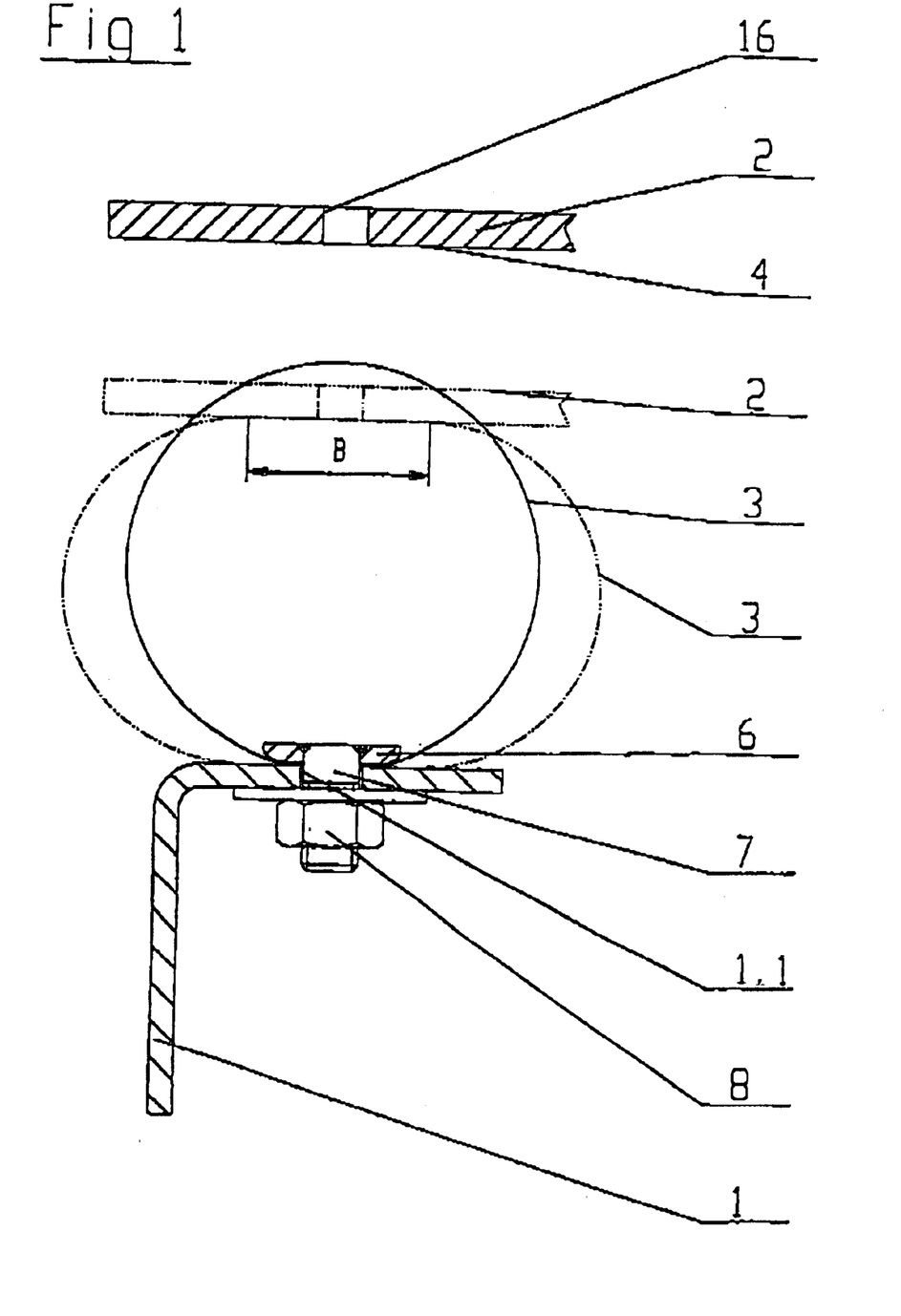
FIG. 1 shows a diagrammatic sectional representation of the device for sealing according to a first embodiment.

A first example of a device for sealing the contact zone between two apparatus parts 1, 2 which are movable relative to one another is shown in FIG. 1. It comprises a sealing element 3 which extends along the contact zone and is fixed on the first apparatus part 1 and also a mating surface 4 which is provided on the second apparatus part 2 and comes into contact with the sealing element 3 in a closed position of the two apparatus parts 1, 2.

The sealing element 3 is formed by a resilient hollow body which in the open position shown by solid lines in FIG. 1 has a circular cross-section at right angles to the longitudinal extent. In the closed position shown by broken lines, a part-zone of the sealing element 3 which is curved in the form of an arc comes resiliently into contact with the mating surface 4 and rests on the mating surface. As a result, a contact zone with the width B is produced in the closed position.

The hollow section body of the sealing element 3 is advantageously formed by a section made from spring steel which is closed in cross-section. In order to fix the sealing element 3 on the first apparatus part 1, the sealing element has openings through which suitable means engage for fixing the sealing element on the first apparatus part.

In the illustrated embodiment, a clamping strip 6 is provided in the interior of the sealing element 3, this clamping strip being fixed on the first apparatus part 1 via openings in the hollow section body of the sealing element 3 in order to hold the sealing element. In this case the clamping strip 6 has for example a plurality of threaded bolts which are spaced from one another in their longitudinal direction and which pass through corresponding openings in the hollow section body of the sealing element 3 and through corresponding openings 1.1 in the first apparatus part. Then in order to fix the strip, corresponding nuts 8 are screwed onto the inserted threaded bolts 7. The sealing element 3 is gripped firmly between the clamping strip 6 and the first apparatus part 1.

The circular cross-section of the sealing element 3 facilitates very great resilient travel so as to be able in particular to compensate for thermal expansions due to the effect of the temperature of any hot gas present. Thus for example a resilient travel of approximately 30 mm is possible in the case of a sealing element with a diameter of 60 mm in the unloaded state. The resulting relatively large width B of the contact zone also ensures reliable sealing.

Figure 2:
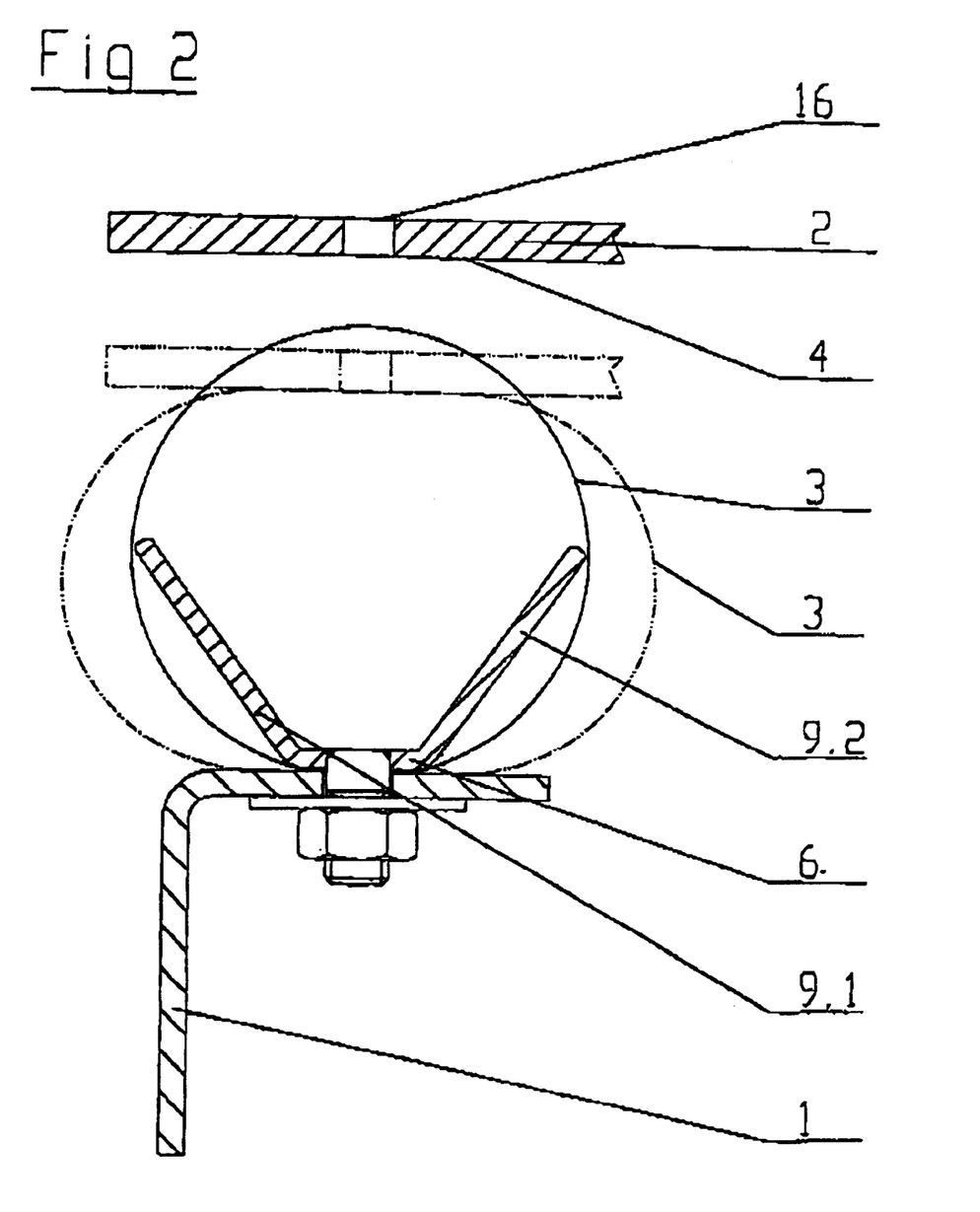
FIG. 2 shows a diagrammatic sectional representation of the device for sealing according to a second embodiment.

The second embodiment shown in FIG. 2 differs from the variant according to FIG. 1 only in that additional means are provided for stabilizing the sealing element 3. The stabilizing means are fixed on the first apparatus part 1 and are advantageously constructed integrally with the clamping strip. In the illustrated embodiment, the stabilizing means have two arms 9.1 and 9.2 which in the open position of the two apparatus parts 1, 2 rest with their end regions on opposing regions of the inner wall of the sealing element 3. As a result, self-oscillations of the sealing element 3 are avoided or reduced even in the case of high flow speeds. Instead of the stabilizing means which are of approximately V-shaped construction in the cross-sectional representation according to FIG. 2, other cross-sectional shapes, for example a T shape, are also conceivable.

In the closed position shown in FIG. 2 by broken lines, the arms 9.1 and 9.2 do not normally come into contact with the inner wall of the sealing element. In the case of very great unilateral pressures, however, a displacement of the sealing element can occur, so that the inner wall then again rests on one of the two arms. However, tests have shown that the illustrated seal is still stable even at pressures of 120 mbar. Only at greater pressures does one of the two arms act as a support, thus preventing lifting off of the seal.

Figure 3:
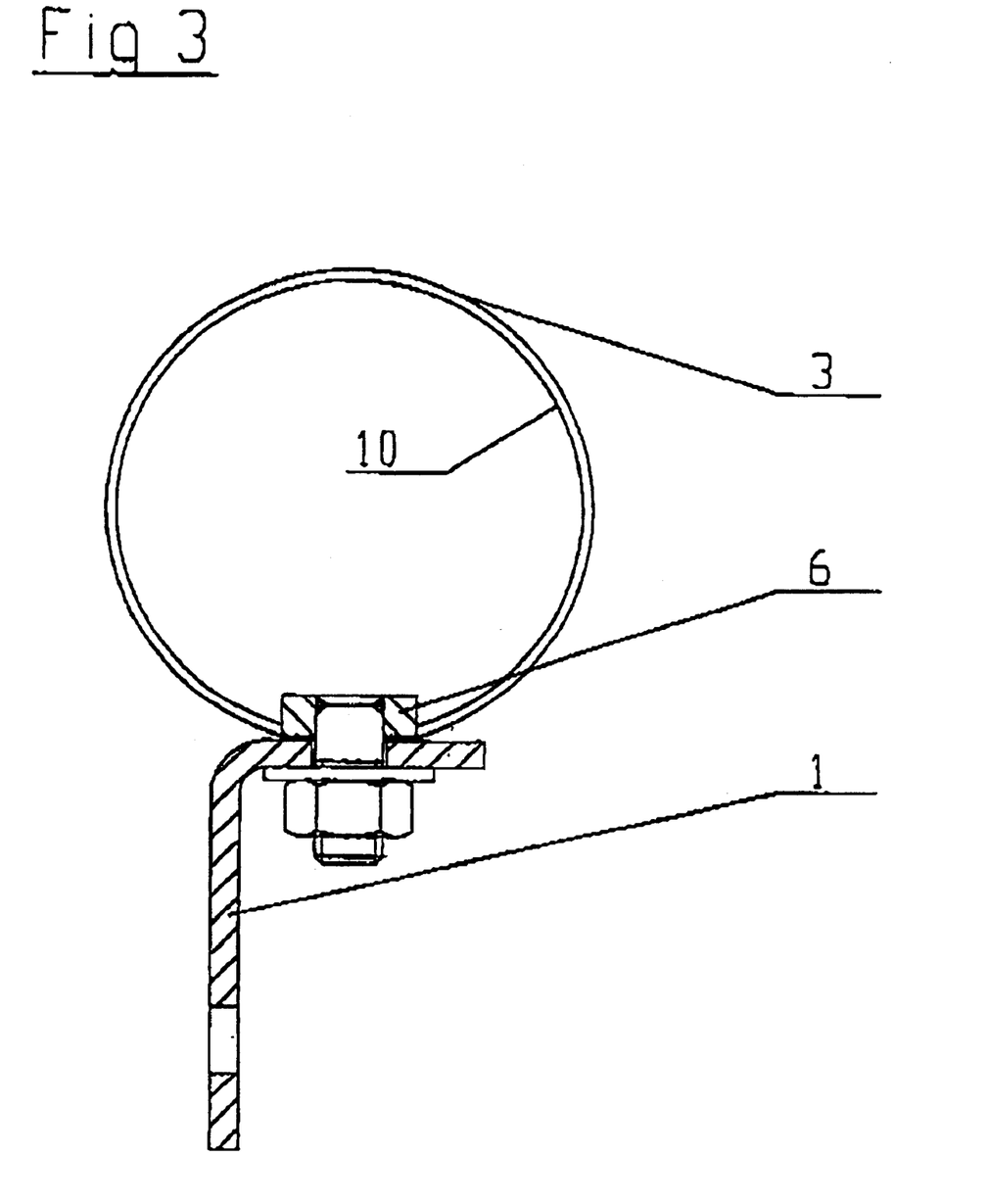
FIG. 3 shows a diagrammatic sectional representation of the device for sealing according to a third embodiment.

The sealing element 3 according to FIG. 3 again corresponds to the embodiment according to FIG. 1, but in this case an additional spring steel sheet 10 is inserted into the hollow section body of the sealing element 3, the spring steel sheet 10 resting against the inner wall of the hollow section body. The spring force of the sealing element can be increased by this additional spring steel sheet 10. Since the spring steel sheet 10 only has to be pushed in, the spring force can also be increased or adapted subsequently as required.

The embodiment according to FIG. 4 again shows the sealing element 3 according to FIG. 1, with a second inner hollow section body 11 with a smaller cross-sectional shape disposed in the sealing element 3. The second hollow section body preferably also has a circular cross-section. The sealing element 3 and the second hollow section body 11 are advantageously clamped together by the clamping strip 6 on the first apparatus part.

Figure 4:
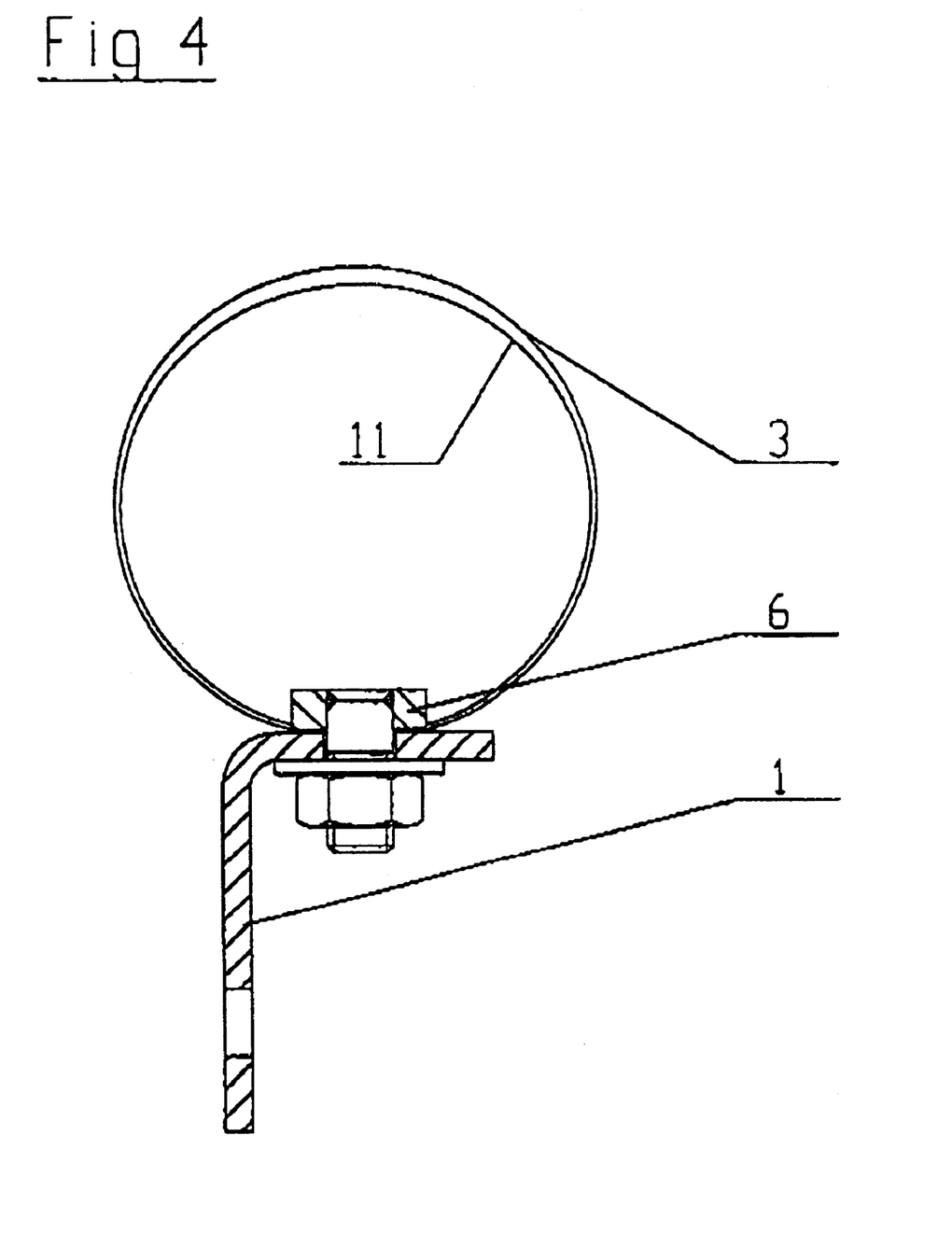
FIG. 4 shows a diagrammatic sectional representation of the device for sealing according to a fourth embodiment.

The second hollow section body 11 is disposed in the interior of the sealing element 3 in such a way that during the closing operation first of all the outer hollow section body is deformed as it comes into contact with the mating surface 4 and as the deformation of the outer hollow section body increases the second hollow section body 11 is also deformed. Thus so long as only the sealing element 3 is deformed the sealing device shown in FIG. 4 is initially softer and then becomes markedly harder as the second hollow section body 11 is additionally deformed.

In the region of the fixing of the sealing element 3, in the first apparatus part 1 is advantageously constructed in such a way that the sealing element 3 is supported on the first apparatus part in the closed position.

Figure 5:
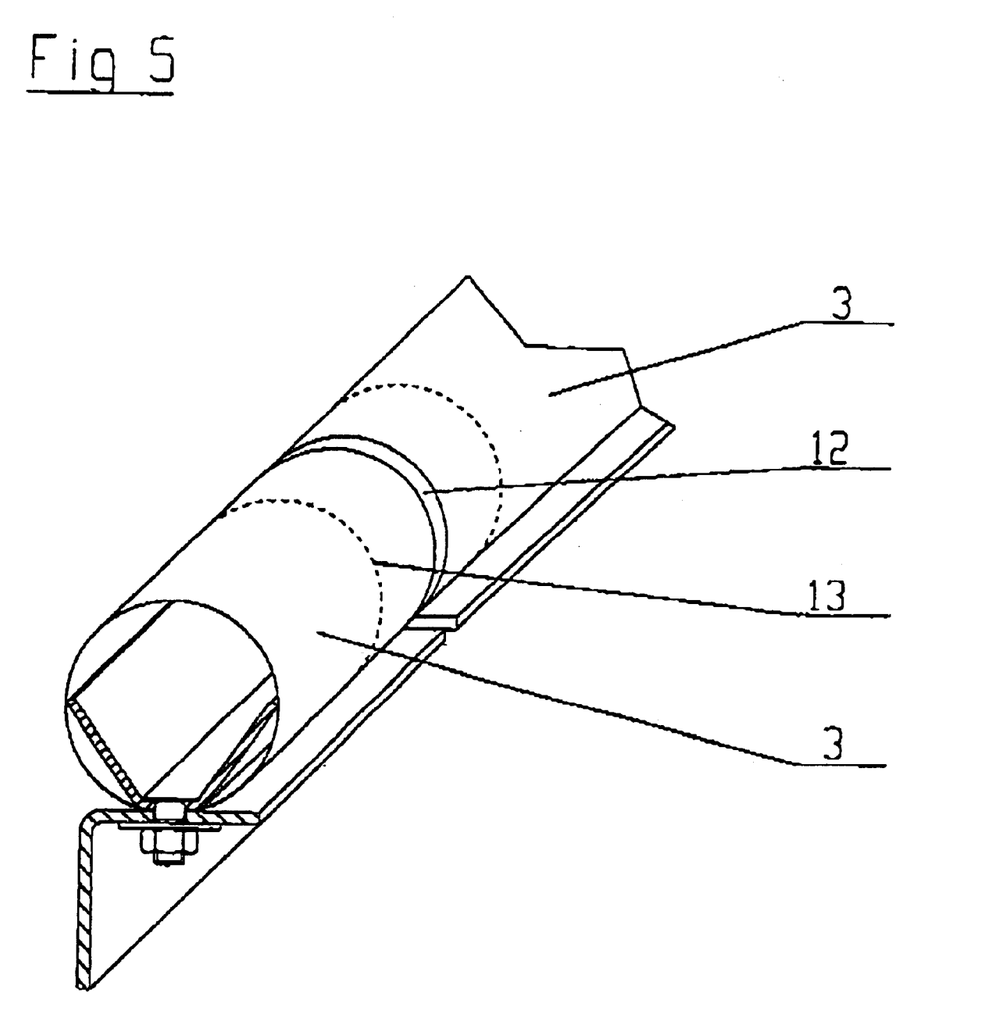
FIG. 5 shows a three-dimensional representation in the connection region of two sealing elements.

The sealing devices described above are used for example for pivoting or rotating flap valves, the width and height or length of which can amount to up to 10 m or more. For process engineering reasons on the one hand and on the other hand in order to simplify the installation, the sealing elements 3 are advantageously installed, in a plurality of pieces for example one meter long which are disposed one behind the other (see FIG. 5). In order to facilitate longitudinal thermal expansions of the sealing elements 3, a gap 12 is left free between adjacent sealing elements. In order nevertheless to ensures a gas-tight seal, a coupling sleeve 13 is pushed halfway into each of two sealing elements 3. The coupling sleeve 13 is advantageously also manufactured from spring steel.

Figure 6A:
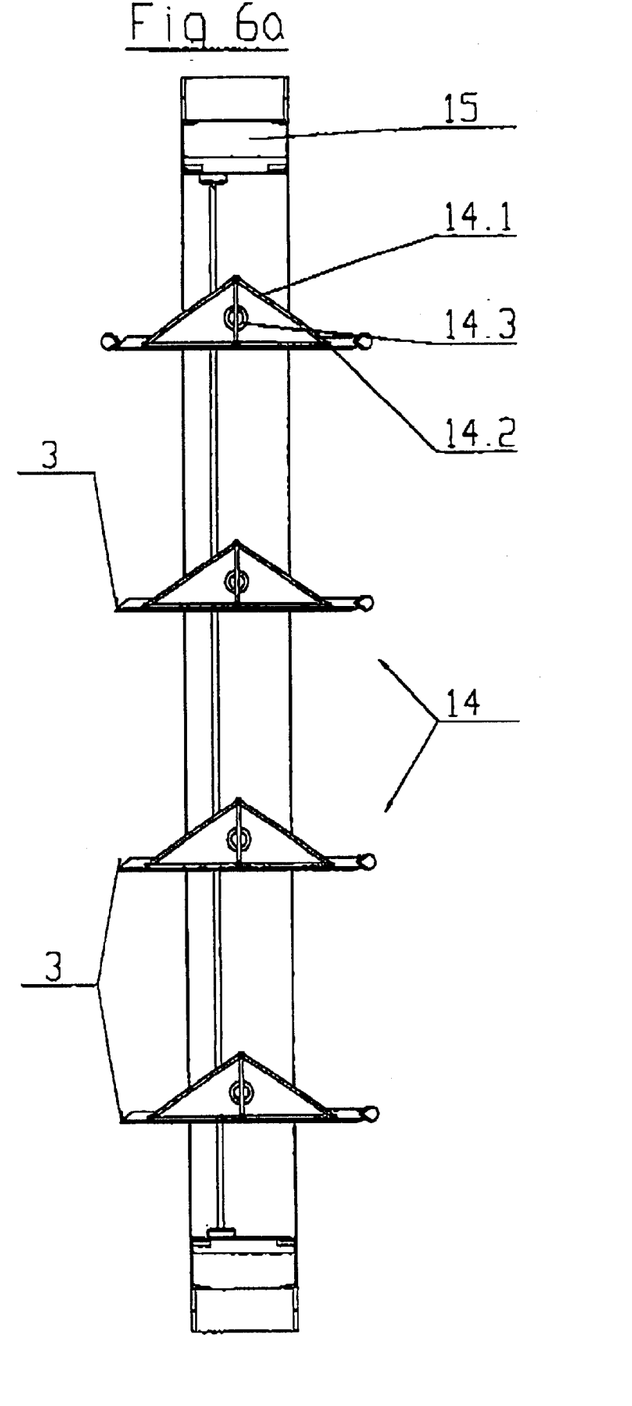
FIGS. 6A and 6B show a diagrammatic representation of a rotating flap valve in the open position and the closed position respectively of the rotating flap.
Figure 6B:
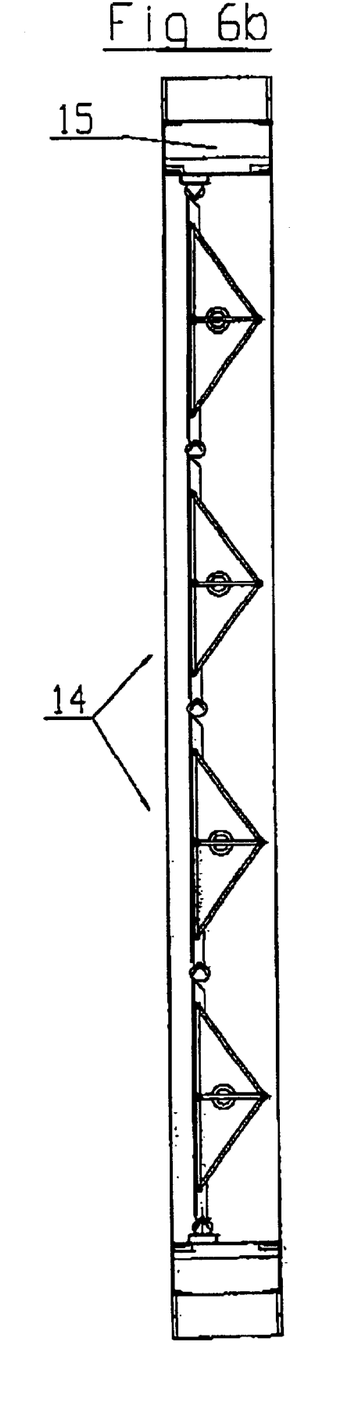

In FIGS. 6A and 6B, a rotating flap valve with four rotating flaps 14 which pivot like louvres is shown in the open and closed position respectively. In the illustrated, embodiment, the rotating flaps consist of a truss 14.1, a flap plate 14.2 and a pivot axle 14.3. The rotating flaps are mounted with their pivot axles 14.3 in a frame 15. Sealing devices of the type described above are provided for sealing the contact zone between adjacent rotating flaps or between a rotating flap and the frame 15. A detail in the region of the sealing device between two rotating flaps 14 is shown in greater detail in FIG. 7. In this case the sealing element 3 is disposed on one of the two rotating flaps 14, whilst the mating surface is provided on the other rotating flap. However, the sealing device is not limited to the embodiment illustrated in FIG. 7. Thus for example the variants illustrated in FIGS. 1, 3 and 4 can also be provided. As the embodiment of the rotating flap valve shows, the sealing device can be disposed not only between two movable apparatus parts (rotary flaps 14) but also between a movable apparatus part (rotary flap 14) and a fixed apparatus part (frame 15).

Figure 7:
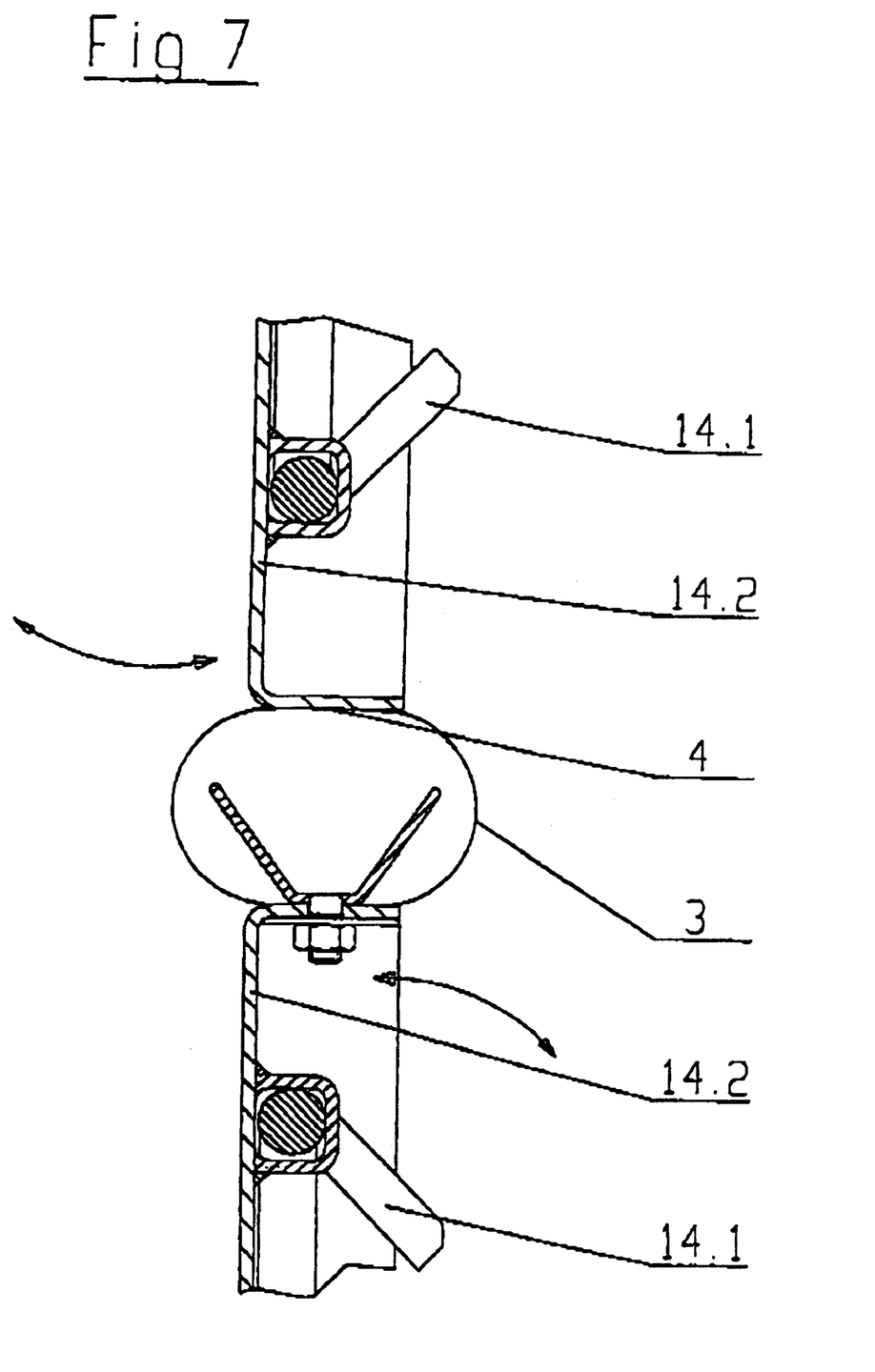
FIG. 7 shows a sectional part-view of two rotating flaps in the closed position according to a first variant.
Figure 8:
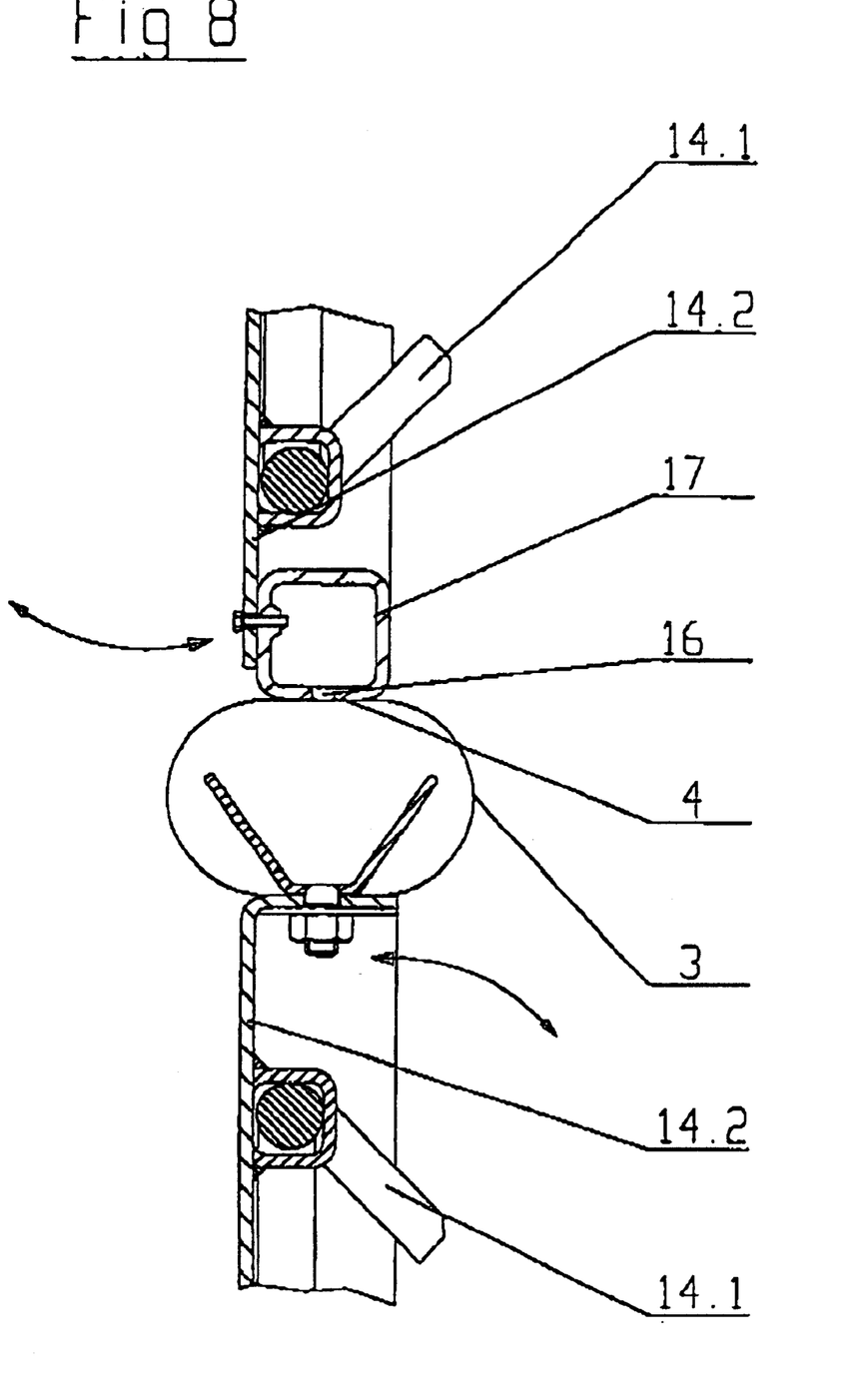
FIG. 8 shows a sectional part-view of two rotating flaps in the closed position according to a second variant.

FIG. 8 shows a further embodiment of the sealing device illustrated in FIG. 7. The special feature of this embodiment resides in the fact that means for delivering confining air are provided in the mating surface 4 along the contact zone. These means are advantageously formed by a slot 16 through which confining air can be pressed into the region of the contact zone. In this case the mating surface 4 is advantageously formed by an outer surface of a hollow section body 17 which has a slot 16 which opens in the outer surface and extends along the contact zone. The hollow section body 17 is constructed for example as a square tube.

Due to the great resilient travel of the sealing element 3 of circular cross-section, a relatively wide contact zone which is particularly suitable for delivery of the confining air is formed on the corresponding mating surface. The sealing element 3 should therefore be deformed in such a way in the closed position that it rests flat on the planar mating surface.

Figure 9:
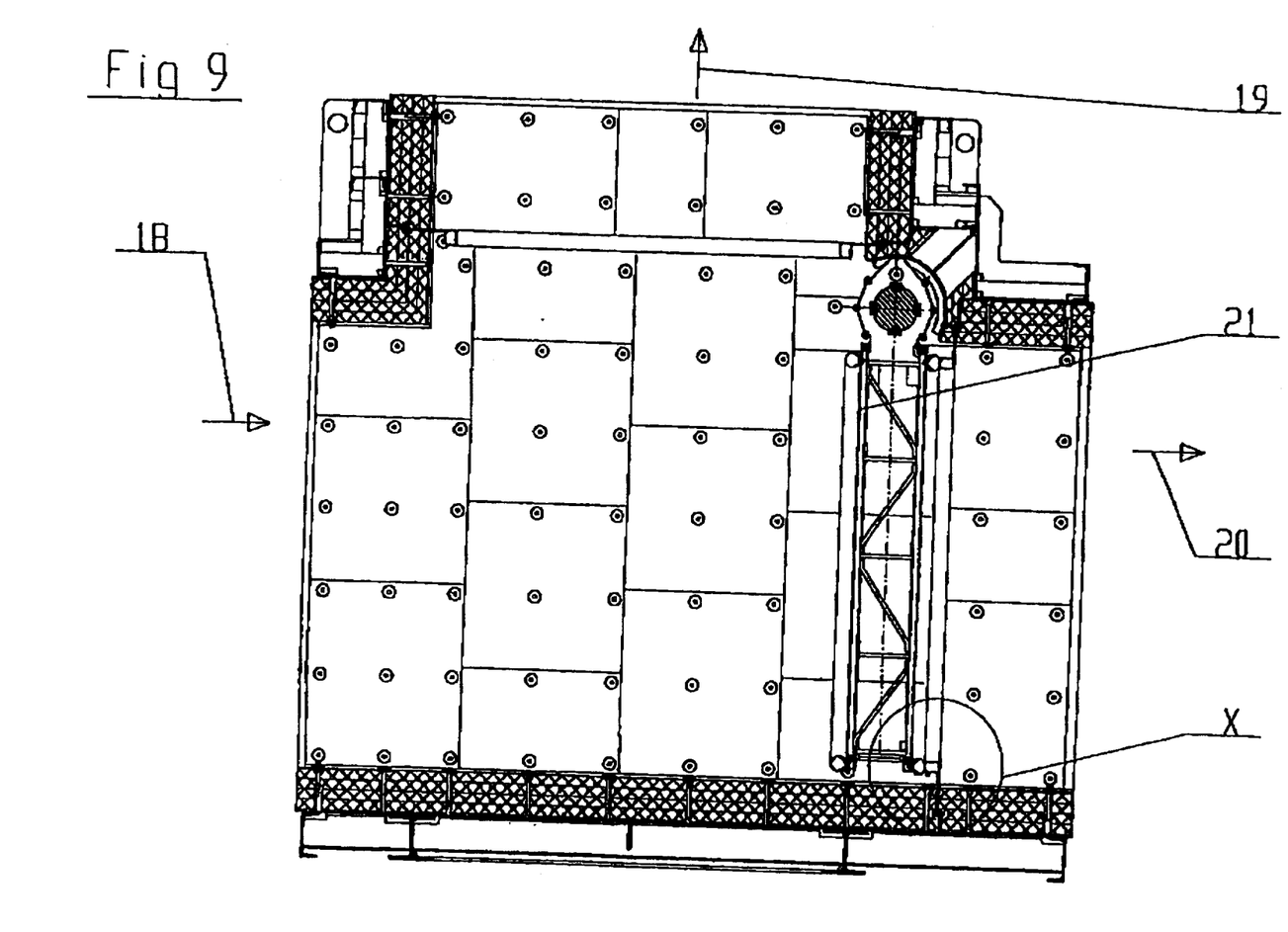
FIG. 9 shows a sectional representation of an apparatus with a pivoting flap valve and FIG. 10 shows a sectional representation of the detail X in FIG. 9.

A further application of the sealing device described above is illustrated in FIGS. 9 and 10. FIG. 9 shows a plan view of a junction of a hot gas pipeline. In this case, the hot gas flows according to the arrow 18 into this junction region and is then conveyed either in the direction of the arrow 19 or in the direction of the arrow 20 depending upon the position of a pivoting flap 21. In the illustrated embodiment, the hot gas would be led off in the direction of the arrow 19. Thus the pivoting flap 21 can shut off one or the other branch as required. In order to ensure gas-tight sealing a sealing device is again provided which can be constructed for example according to one of the embodiments described above.

Figure 10:
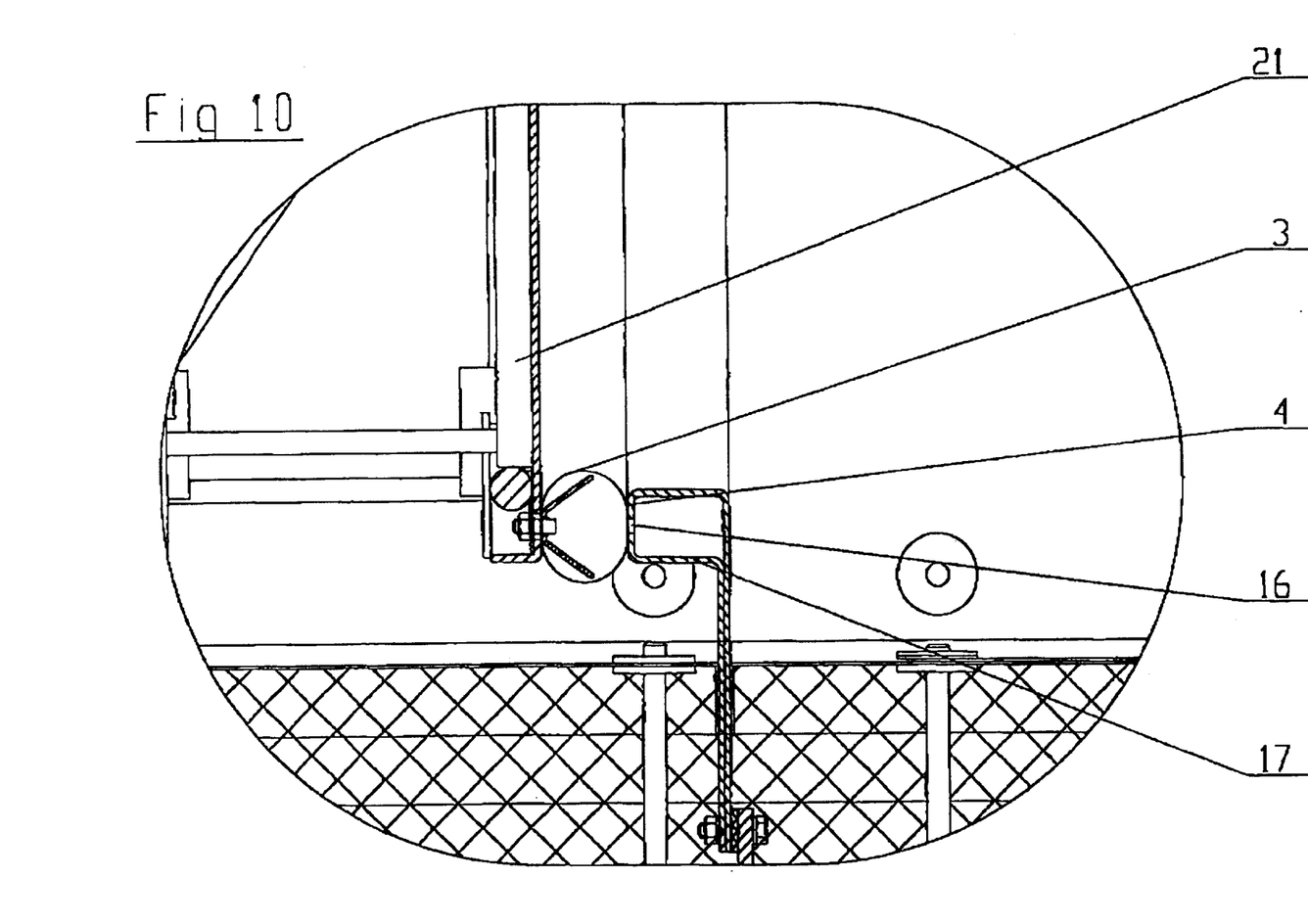

According to FIG. 10, the sealing element 3 here is attached to the pivoting flap 21 and co-operates with a corresponding mating surface 4. The mating surface again has means for delivering confining air which are formed by a slot 16 which opens in the mating surface 4. In this case, the confining air is delivered for example via a hollow section body 17, the mating surface 4 being constructed on an outer surface of the hollow section body 17.

The means for delivering confining air can also be provided if required in the other embodiments which have been described (FIGS. 1 to 4). In FIGS. 1 and 2, therefore, a corresponding slot 16 is indicated in the mating surface.

Naturally, the sealing device according to the invention can also be used without the delivery of confining air. However, with the use of confining air a hundred percent sealing can be achieved. In this case, however, it is not necessary to deliver the confining air in the region of the contact zone. It would also be conceivable to dispose adjacent to one another two sealing elements which in the closed position rest on a common mating surface. The slot for the confining air could then open into the space between the two sealing elements.

However, the variant illustrated in FIGS. 8 and 10 in which the confining air is delivered in the region of the contact zone between the sealing element and the mating surface can be produced at considerably less cost. However, this presupposes that the sealing element rests on the mating surface in such a way that a sufficiently wide contact zone is formed.

Although the sealing element 3 of circular cross-section is particularly suitable for the delivery of confining air in the region of the contact zone, other cross-sectional shapes of sealing elements are, however, conceivable, but care should be taken to ensure a good seal over the widest possible contact zone.

What is claimed is:

1. A sealing device for sealing a contact zone between first and second apparatus parts which are movable relative to one another, comprising:

a sealing element which extends along the contact zone and is fixed on the first apparatus part, the sealing element being formed by a resilient hollow section body which has at right angles to its longitudinal extent a part-zone which is curved in an arc shape in an open position of the two apparatus parts and rests resiliently on the mating surface in the closed position of the two apparatus parts;

a mating surface which is provided on the second apparatus part and comes into contact with the sealing element in a closed position of the two apparatus parts; and means for stabilizing the hollow section body which are disposed in the hollow section body and fixed on the first apparatus part and which in cross-section have at least two arms which in the open position of the two apparatus parts rest with their end regions on opposing regions of the inner wall of the hollow section body;

wherein the hollow section body, in an open position, has a circular cross-section at right angles to its longitudinal extent, and wherein at least one clamping strip is provided in the interior of the hollow section body, this clamping strip being fixed on the first apparatus part via openings in the hollow section body in order to hold the sealing element.

2. A sealing device as claimed in claim 1, wherein the hollow section body is formed by a section made from spring steel which is closed in cross-section.

3. A sealing device as claimed in claim 1, wherein the clamping strip and the stabilizing means are constructed in one piece.

4. A sealing device as claimed in claim 1, wherein the mating surface is of planar construction and the sealing element is deformed in such a way in the closed position that it rests flat on the mating surface.

5. A sealing device as claimed in claim 1, wherein the mating surface further includes means for delivery of confining air along the contact zone.

6. A sealing device as claimed in claim 1, wherein the mating surface has a slot for delivery of confining air along the contact zone.

7. A sealing device as claimed in claim 1, wherein the mating surface is formed by an outer surface of a hollow section body which has a slot which opens in the outer surface and extends along the contact zone and through which confining air can be delivered.

8. A sealing device for sealing a contact zone between first and second apparatus parts which are movable relative to one another, comprising:

a sealing element which extends along the contact zone and is fixed on the first apparatus part, the sealing element being formed by a resilient outer hollow section body which has at right angles to its longitudinal extent a part-zone which is curved in an arc shape in an open position of the two apparatus parts and rests resiliently on the mating surface in the closed position of the two apparatus parts;

a mating surface which is provided on the second apparatus part and comes into contact with the sealing element in a closed position of the two apparatus parts; and an inner hollow section body with a smaller circular cross-section disposed in the sealing element in such a way that during the closing operation the outer hollow section body is deformed as it comes into contact with the mating surface and as the deformation of the outer hollow section body increases, the inner hollow section body is also deformed;

wherein the hollow section body, in an open position, has a circular cross-section at right angles to its longitudinal extent, and wherein at least one clamping strip is provided in the interior of the hollow section body, the clamping strip being fixed on the first apparatus part via openings in the hollow section body in order to hold the sealing element.

* * * * *